Figure 1:
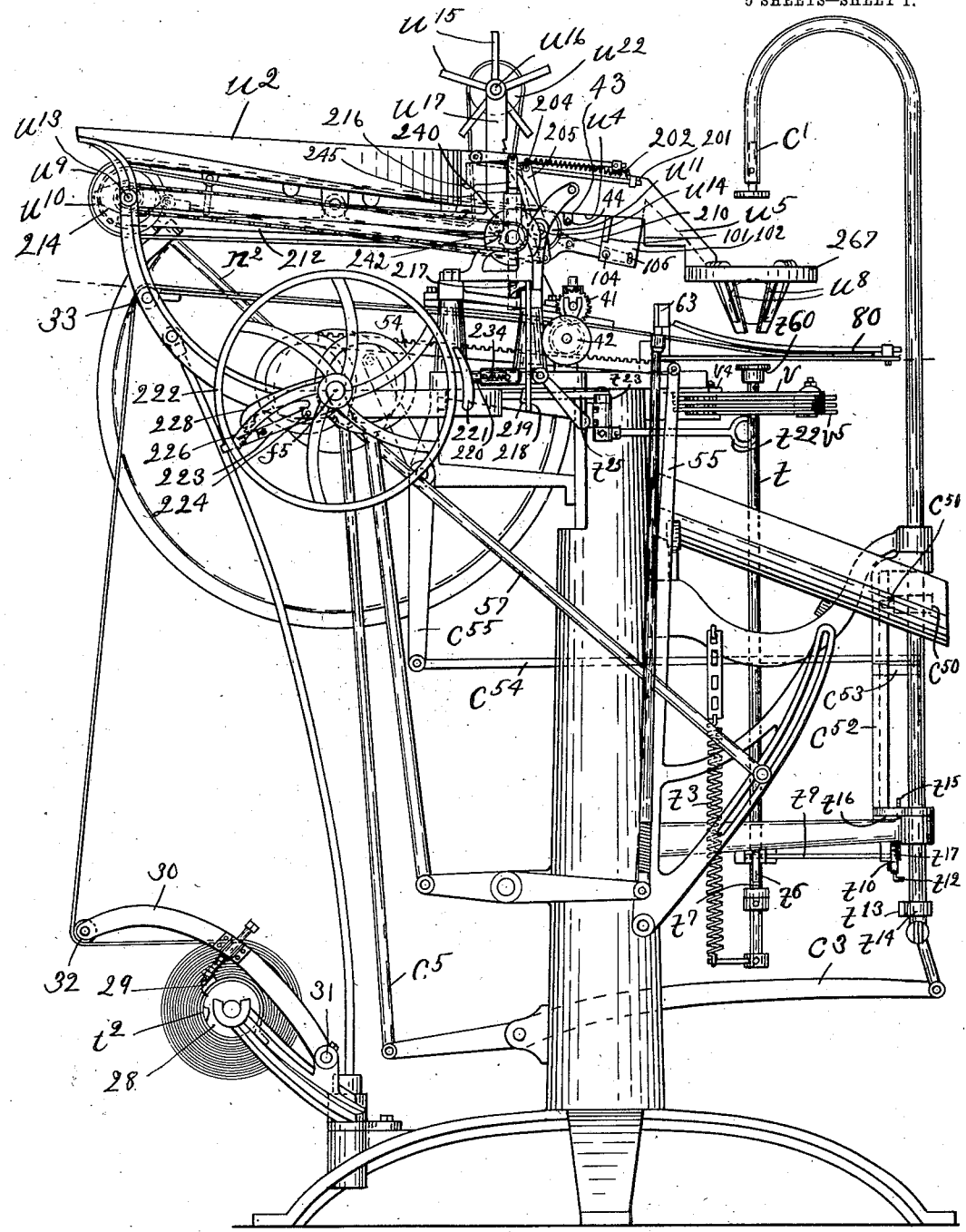

No. 812,912. PATENTED FEB. 20, 1906.
M. H. BALLARD.
WRAPPING MACHINE.
APPLICATION FILED FEB. 13, 1904.

5 SHEETS—SHEET 1.

Witnesses:
H. B. Davis.
D. A. Howard.

Inventor:
Milton H. Ballard
by Noyes & Harriman
Attys

No. 812,912. PATENTED FEB. 20, 1906.
M. H. BALLARD.
WRAPPING MACHINE.
APPLICATION FILED FEB. 13, 1904.
5 SHEETS—SHEET 2.
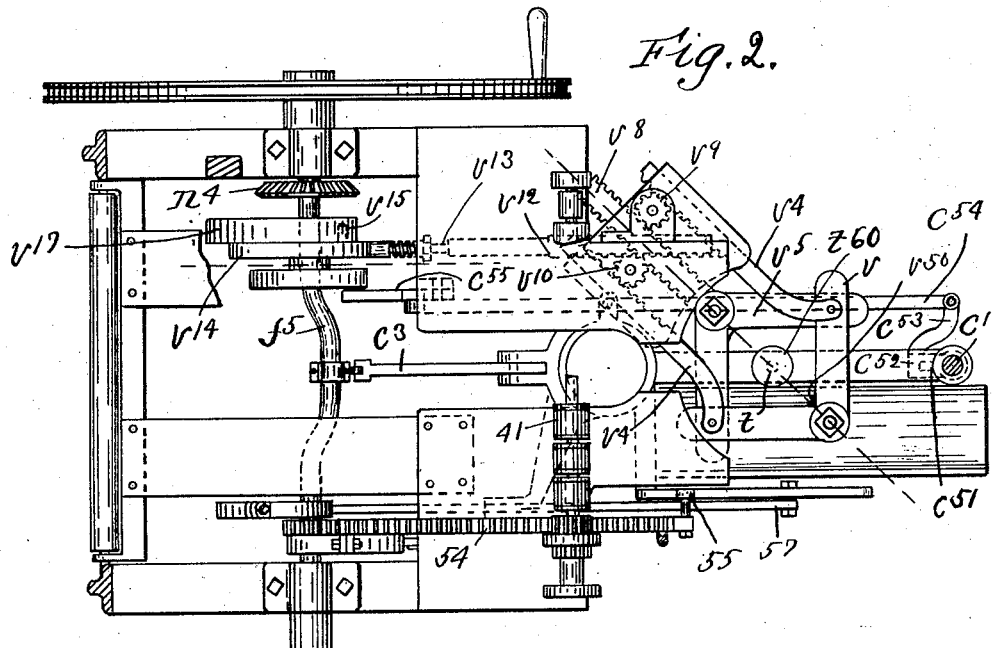
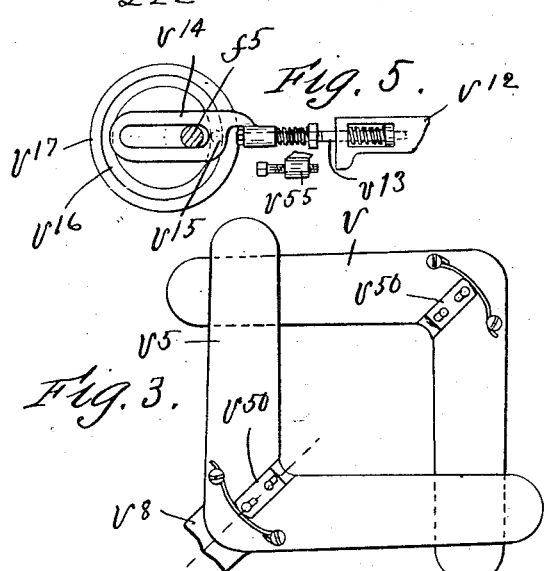
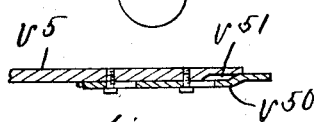
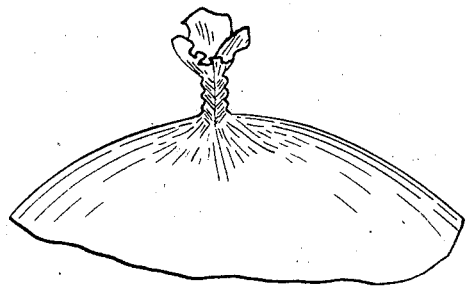
Witnesses:
H. B. Davis
D. H. Howard
Inventor:
Milton H. Ballard
by Hayes & Harriman
Attys.

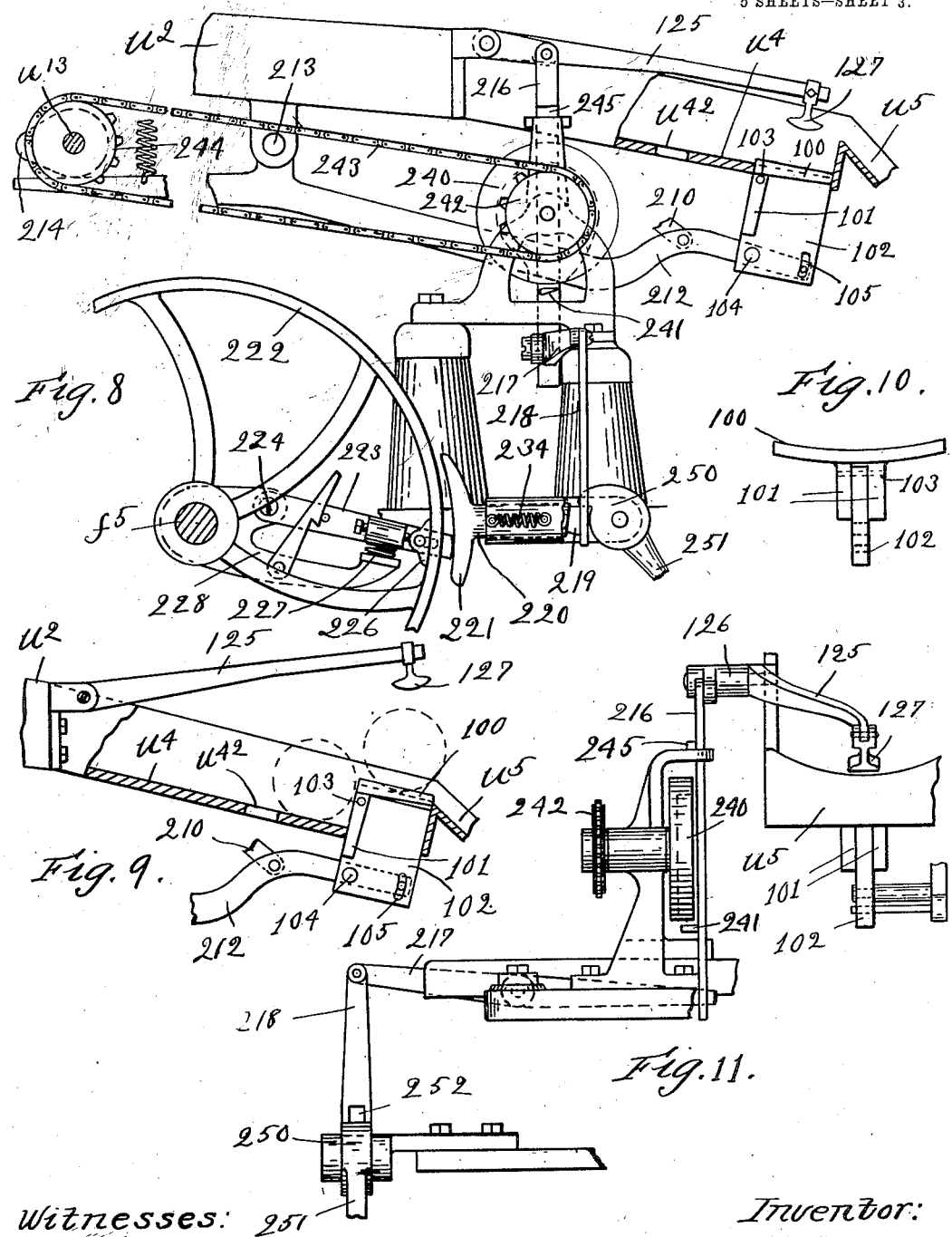

No. 812,912. PATENTED FEB. 20, 1906.
M. H. BALLARD.
WRAPPING MACHINE.
APPLICATION FILED FEB. 13, 1904.
5 SHEETS—SHEET 4.
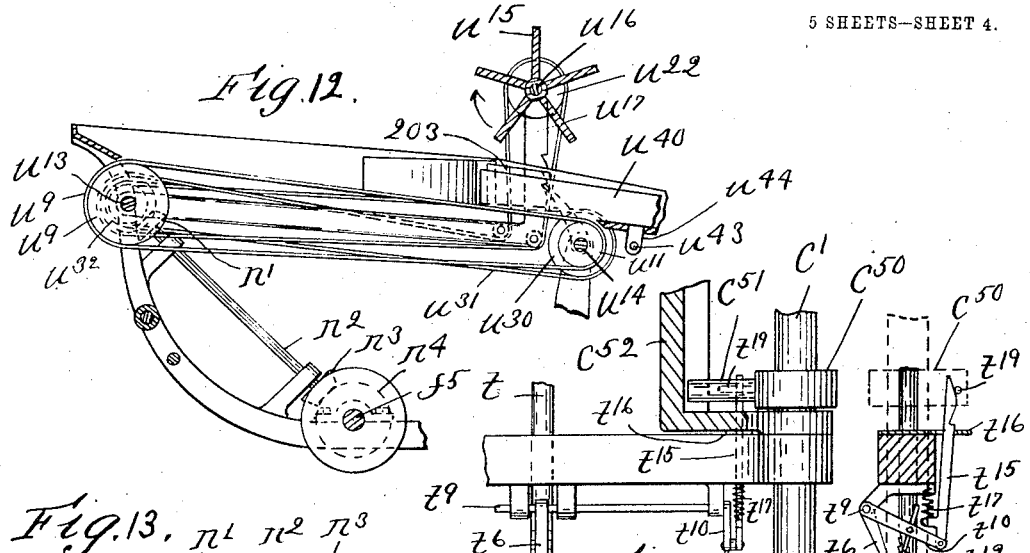
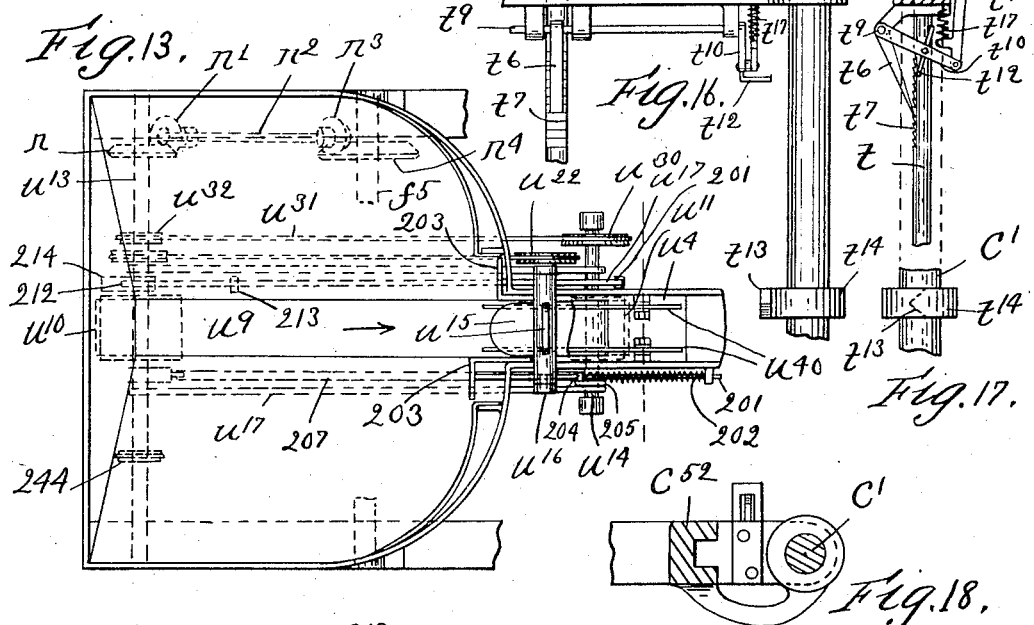
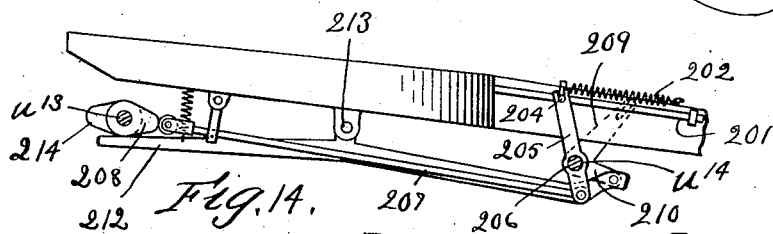
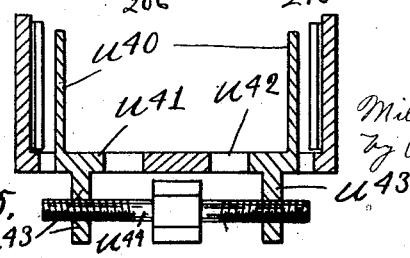
Witnesses:
H. B. Davis.
D. A. Howard.
Inventor:
Milton H. Ballard
by Ayres & Harriman
Attys No. 812,912. PATENTED FEB. 20, 1906.
M. H. BALLARD.
WRAPPING MACHINE.
APPLICATION FILED FEB. 13, 1904.

5 SHEETS—SHEET 5.

Witnesses:
H. B. Davis.
D. A. Howard.

Inventor:
Milton H. Ballard
by Boyce & Harriman
Attys

UNITED STATES PATENT OFFICE.

MILTON H. BALLARD, OF LYNN, MASSACHUSETTS, ASSIGNOR TO TRIPP FRUIT WRAPPING MACHINE COMPANY, A CORPORATION OF MAINE.

WRAPPING-MACHINE.

No. 812,912.   Specification of Letters Patent.   Patented Feb. 20, 1906.

Application filed February 13, 1904. Serial No. 193,392.

*To all whom it may concern:*

Be it known that I, MILTON H. BALLARD, of Lynn, county of Essex, State of Massachusetts, have invented an Improvement in Wrapping-Machines, of which the following description, in connection with the accompanying drawings, is a specification, like characters on the drawings representing like parts.

This invention relates to wrapping-machines, and is intended as an improvement upon the wrapping-machine shown and described in United States Patents No. 472,202, dated April 5, 1892; No. 516,136, dated March 6, 1894; No. 548,677, dated October 29, 1895; No. 595,421, dated December 4, 1897, and No. 682,823, dated September 17, 1901, said machine being especially designed for wrapping more or less spherical objects, such as oranges.

The invention has for its object to construct a raceway or trough leading to the wrapping devices with adjustable side walls, whereby articles of one size or another are held in alinement instead of being permitted to stagger therein; also, to provide means connected directly with a power-driven shaft for positively operating the agitators which are contained within and located at opposite sides of its exit; also, to provide a delivering device for delivering the endmost article from the trough in such manner that it may pass freely to the wrapping devices, said delivering device being movable upward in a straight line and being positive in operation and effective in results; also, to provide a stop-motion for the machine which is adapted to be operated by suitable mechanism to start the machine and to be thereafter controlled by the presence or absence of the article at a predetermined point at a predetermined time; also, to provide disengaging devices for disengaging the jammed or pinched wrappers from the jamming or pinching jaws, to thereby prevent the wrapped article from being caught and held by said jaws; also, to regulate the movement of said jaws from each other to thereby provide for wrappers of different sizes; also, to provide means for moving the plunger-rod on its vertical axis, which shall not be subject to undue wear and which will be positive and effective in operation; also, to provide a locking device for the rest upon which the article is deposited, which is operated by the plunger-rod to engage and disengage the rest, said locking device holding the rest in its lowermost position while the plunger-rod rises, then disengaging said rest, permitting it to rise, and then again engaging said rest when the plunger-rod resumes its lowermost position; also, to provide means for operating the ejector from one of the power-driven shafts.

Figure 19:
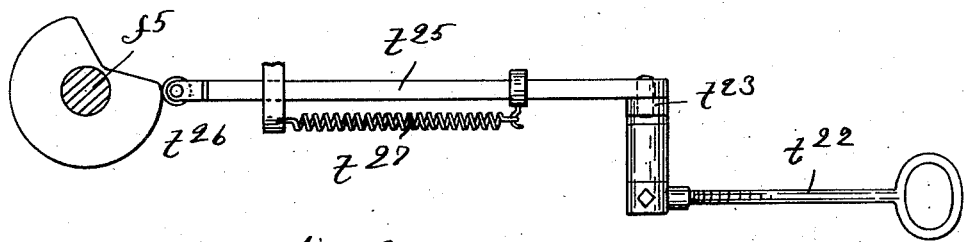
Figure 20:
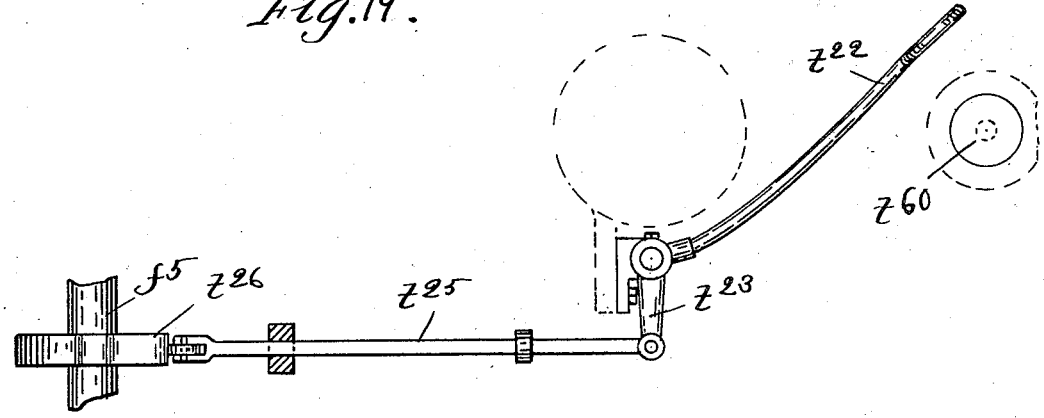

Figure 1 shows in side elevation a wrapping-machine embodying this invention. Fig. 2 is a plan view of a portion of the machine, showing particularly the jamming or pinching devices and means for operating them. Fig. 3 is an enlarged detail showing an under side view of the jamming or pinching jaws and the disengaging devices for disengaging the wrapper from said jaws. Fig. 4 is a sectional detail of the jamming or pinching jaws. Fig. 5 is a detail showing a portion of the operating mechanism for the jamming or pinching jaws and means for limiting the movement of said jaws in a direction away from each other. Fig. 6 is a sectional detail of one of the disengaging devices for the wrapper. Fig. 7 is a detail showing a portion of the wrapper with its edges gathered in and jammed or pinched together. Fig. 8 is a detail showing in side elevation the stop-motion for the machine and the delivering device for the articles. Fig. 9 is a detail of a portion of the stop-motion mechanism and delivering device to be referred to. Fig. 10 is an end view of the delivering device to be referred to. Fig. 11 is a detail showing in front elevation the stop-motion for the machine and the delivering device. Fig. 12 is a detail showing in side elevation the hopper for the article and means for moving the article from the hopper to the delivering-trough. Fig. 13 is a detail showing a plan view of the parts shown in Fig. 11. Fig. 14 is a detail showing in side elevation the means for operating the agitators which are contained in the hopper. Fig. 15 is a cross-section of the delivering-trough. Fig. 16 is a detail showing portions of the plunger-rod and rest-rod and the locking device for the rest-rod. Fig. 17 is a detail showing particularly the locking device for the rest-rod and means for operating it. Fig. 18 is a sectional detail of the plunger-rod and swinging bracket thereon to be referred to. Figs. 19 and 20 are details of the ejector.

The declining hopper $u^2$ for the articles, which is supported by the frame at the top of the machine, has a narrow exit from which leads a declining trough $u^4$, the side walls of which are made adjustable toward and from each other to provide a runway of a width to hold the articles in alinement and prevent them from becoming staggered. In a wide trough small articles will stagger and clog.

As shown in Fig. 15, $u^{40}$ $u^{40}$ represent the adjustable side walls, which rise from a base $u^{41}$, which is fitted to slide freely in slots $u^{42}$, formed in the base of the trough, and ears $u^{43}$ are formed on said bases $u^{41}$, which receive a right and left threaded screw $u^{44}$, which is employed to move the side walls $u^{40}$ toward and from each other and hold them in whatever position they may be set.

A traveling feeding-belt $u^9$, moving in the direction of the arrow, Fig. 13, is placed in an opening in the bottom of the hopper $u^2$, which passes over pulleys $u^{10}$ $u^{11}$, the pulley $u^{10}$ being loosely mounted on a shaft $u^{13}$ and the pulley $u^{11}$ being secured to a shaft $u^{14}$. The shaft $u^{14}$ bears a belt-pulley $u^{30}$, over which a belt $u^{31}$ passes, which passes over a belt-pulley $u^{32}$, secured to the shaft $u^{13}$, to which is secured a bevel-gear $n$, which is engaged by a bevel-pinion $n'$, secured to a diagonal shaft $n^2$, bearing the bevel-pinion $n^3$, which engages a bevel-gear $n^4$, secured to the main shaft $f^5$.

A plurality of blades $u^{15}$, moving in the direction of the arrow, Fig. 12, are secured to a shaft $u^{16}$, bearing a belt-pulley $u^{22}$, over which a belt passes, said belt passing over a pair of idle pulleys and over a belt-pulley which is secured to said shaft $u^{13}$. These blades knock back into the hopper any superimposed articles.

The shaft bearing the blades $u^{15}$ is supported by a pair of bent arms $u^{17}$ $u^{17}$, which are supported upon the shaft $u^{13}$, and the upright portions of said arms are notched to receive pawls loosely mounted on the shaft $u^{14}$, thereby providing for holding the plates $u^{15}$ at different elevations.

Within the hopper and at opposite sides of its exit two agitators 203 are placed to push away the articles at the sides of the exit, and thereby provide a passage for the articles to said exit. The agitators consist of flat plates projecting laterally from sliding bars 201. One of said bars has a spring 202 connected to it for moving it in one direction and has a laterally-projecting pin 204, which enters the slotted end of a lever 205, pivoted at 206, the lower end of which is loosely connected to a sliding bar 207, bearing at its rear end a roll which bears upon a cam 208, secured to the shaft $u^{13}$. During each revolution of the shaft $u^{13}$ the agitator is moved by the cam 208. The sliding bar of the other agitator has a laterally-projecting pin which enters a slot in one arm 209 of a bell-crank lever, also pivoted at 206, the other arm 210 of said lever being loosely connected to a lever 212, pivoted at 213, the outer end of which is operated upon by a cam 214, secured to the shaft $u^{13}$. During each revolution of said shaft the agitator will be moved by the cam. The cams are so disposed on the shaft as to operate the agitators alternately.

At the end of the trough $u^4$ an upright shoulder is provided, (see Fig. 8,) against which the articles strike, and beyond said shoulder a chute $u^5$ extends to the wrapping devices. The endmost article is lifted bodily so that it may pass over the shoulder, and to accomplish this result an opening is formed in the bottom of the trough $u^4$ next the shoulder, through which a lifter projects. The lifter consists of a curved plate 100, (see Fig. 10,) having a pair of arms 101 extending downwardly from its under side, which bestride a vertical plate 102, and a pivot-pin 103 passes through said arms and the plate 102 at a point just beneath the plate 100. The plate 102 is pivotally connected at 104 to the lever 212 and is slotted at 105 to receive a pin projecting laterally from said lever. As the end of the lever 212, bearing the lifter, is raised said lifter rises from the bottom of the trough to the top of the shoulder, or thereabout, and bodily lifts the article resting thereon. By pivotally connecting together the several parts of the lifter said lifter is free to move upward in a straight line and at all times provides a declining support for the article.

It is necessary to stop the machine when the lifter operates to lift the endmost article, and the endmost article is absent, so that the wrapper feeding and severing devices will not operate, and heretofore a stop motion has been provided on machines of this type for this purpose; but they have been operated by the article passing down the declining-chute, and in practice such means of operating the stop-motion is inefficient, for the reason that unless all the parts are in the best possible working order the article is liable to be caught and held by the stop-motion mechanism and the machine thereby allowed to run and feed severed wrappers to the wrapping devices. Herein the means for operating the stop-motion is controlled by the article instead of operated by it and the above difficulty is obviated. An arm 125 is pivoted to a fixed support and is disposed lengthwise the trough $u^4$ at a suitable distance above it, and the outer end of said arm bears a shoe 127, which occupies a position above the lifter, this point being selected for detecting the presence or absence of the article. The arm 125 has a hub 126, from which an arm extends, to which is loosely connected a vertical bar 216, having a hole at its lower end, through which projects one end of a pivoted lever 217, the opposite end of said lever having loosely connected to it a vertical bar 218, bearing at its lower end a wedge-block 219, which moves into and out of engagement with the beveled or obliquely-formed end of a short horizontal sliding bar 220, having a shoe or end piece 221 at its extremity, provided with a curved face. The sliding bar 220 is moved in a direction toward the loose driving-wheel 222 by a spring 234 and is held against rearward motion by the wedge-block when said wedge-block is brought into engagement with it for the purpose of stopping the machine, and said sliding bar and end piece thereon serve as a yielding restraining device for the clutch mechanism to be described.

The clutch mechanism consists of an operating-arm 223, pivoted at 224 to a hub secured to the main shaft, and said arm projects outwardly and bears a shoe 226, which is adapted to engage the rim of the loose driving-wheel, and said operating-arm is raised by a spring 227 on the fixed arm 228, so that the shoe 226 will firmly engage the rim of the driving-wheel, and the shaft $f^5$ will be thereby turned; but whenever said arm is pressed down against action of said spring the shoe 226 will be moved out of firm engagement with said rim and the shaft $f^5$ will remain at rest. The operating-arm extends beyond the driving-wheel and into engagement with the shoe or end piece 221 of the yielding restraining device, and when said restraining device is free to yield the arm will freely pass by and the main shaft will revolve; but when said restraining device is held positively the arm will be caught and held and the shaft will cease turning.

The position of the wedge-block 219 determines whether the restraining device shall yield or not, and the position of the wedge-block is determined by the position of the arm 125. When the arm 125 is raised, the wedge-block will be lowered and will permit the restraining device to yield and the operating-arm of the clutch mechanism to pass by it; but when the arm 125 falls the wedge-block will rise and will engage the yielding restraining device and the operating-arm will be held.

A cam 250 is pivoted to the frame, which has a handpiece 251 for turning it, which latter serves as the starting-lever, and said cam is located close to the wedge-block, so that the wedge-block occupies a position between said cam and the oblique end of the yielding restraining device, and the cam thus supports and guides the lower end of the vertical bar 218, and said cam has a projection which enters a slot 252 in the bar 218, which is made long enough to provide for an independent movement of said bar, and when said cam is turned by the handpiece the bar 218 will be drawn down, the yielding restraining device will be disengaged, the clutch mechanism released, and the arm 125 raised sufficiently to permit the passage of an article beneath it onto the lifter. To positively hold the arm 125 elevated during a complete revolution of the shaft $f^5$, which is while one article is being wrapped, a cam-disk 240 is located at the side of the vertical bar 216, having a groove and an entrance slot or passage leading thereto adapted to receive a lateral projection 241 on the bar 216, and said cam makes one revolution while each article is being wrapped. As the arm 125 is raised by the cam 250 when starting the machine the projection 241 will enter the groove of the cam 240, and as said cam 240 revolves said arm will be positively held in its elevated position until the entrance to the groove again comes opposite the projection. The arm 125 is then placed under the control of the article and is free to fall if the article is absent; but if the article is present it will be held in elevated position by said article and the cam 240 will make another revolution. To the shaft of the cam-disk 240 a sprocket-wheel 242 is secured, over which passes a sprocket-chain 243, which passes over a sprocket-wheel 244, secured to the shaft $u^{13}$. A lateral projection 245 is provided on the vertical bar 216, which by striking on the frame limits the downward movement of the arm 125. Thus it will be seen that the arm 125 is raised when the machine is started and is positively held in elevated position for a predetermined length of time and is then placed under the control of the article, and if the article is present it will remain in elevated position; but if the article is absent it will fall, and when falling the wedge-block will be raised, the restraining device held, and the clutch mechanism engaged. As long as the articles follow in succession the arm 125 will remain elevated; but as soon as the article is absent the arm will fall and the machine stop. The lifter makes its complete excursion, rising and falling, while the arm 125 is positively held by the cam 240, so that ample time is allowed for the next article to pass onto the lifter before the arm 125 is temporarily released and placed under the control of the article.

The centering device to which the articles pass from the chute comprises a ring 267, open at one side, having a plurality of depending spring-pressed fingers $u^8$, which gradually converge, and the article to be wrapped passes through said ring and is supported by the converging arms in correct position above the support 80 for the wrapper.

A roll $i^2$ is supported at the base of the machine, upon which a roll of paper is placed, and the strip of paper from the roll passes under a take-up roll 32, thence over an idle roll 33, thence between a pair of feeding-rolls 41 42, and thence beneath a movable shear-blade 63 of a pair of shears to the wrapper-support 80. The take-up roll 32 is borne by a pair of arms 30, pivoted at 31, and brake mechanism for the paper-carrying roll is connected with said arms 30, but said brake mechanism for the paper-carrying roll and means for operating it and the means for drawing the paper from the roll form the subject-matter of a divisional application filed by me October 2, 1905, Serial No. 280,909, and consequently are not herein claimed.

The paper-feeding rolls 41 42 are positively driven by a rack-bar 54, connected to a pivoted arm 55, which is operated by a rod 57, connected with an eccentric on the main shaft $f^5$, said rod being adjustably connected with the operating-lever of the rack-bar, so that by changing the adjustment the paper will be advanced different distances to thereby provide wrappers of different lengths.

Beneath the wrapper-holder 80 a set of jaws are located, adapted to close together and gather in the edges of the wrapper and jam or pinch said edges together severely and by so doing to more of less corrugate, indent, or score the wrapper and form a neck and cause it to hold sufficiently for all practical purposes. The set of jaws comprises two piles of angularly-formed plates $v$ $v^5$, the plates of each pile being bolted together and held separated by washers which provide spaces between plates of each pile adapted to receive the plates of the other pile, and said piles of plates are so disposed as to present a substantially square passage between them for the article. The uppermost plate of the set of plates $v$ is attached to two bars $v^4$, arranged in suitable guideways and movable longitudinally in a horizontal plane. The uppermost plate of the pile of plates $v^5$ is secured to a bar $v^8$, having its bearings in the frame and movable longitudinally in parallelism with the bars $v^4$, and it is designed that the plates $v$ and $v^5$ shall move toward and from each other, and thus constitute a set of jaws which gather in the edges of the wrapper and jam them firmly together or pinch them.

The plates $v$ and $v^5$ are made quite thin, so as to sharply corrugate, indent, or score the wrapper, and the spaces between the plates of each pile are correspondingly narrow, and as a result the wrapper is sometimes caught between the plates and is so held that the article will remain in engagement with the plates when said plates begin to separate. To prevent the jammed or pinched wrapper from being thus caught and held or otherwise retained by the jaws when they separate, means are provided which are herein termed "disengaging devices," which act to disengage the jammed or pinched wrappers from the jaws to thereby free them as the jaws recede from each other. The disengaging device consists of a narrow plate $v^{50}$, placed against the under side of each pile of plates $v$ and $v^5$ and held thereon by headed screws passing through longitudinal slots formed in the plates $v^{50}$. The plates $v^{50}$ are located midway of the plates $v$ $v^5$ at the opposite corners of the opening or passage between them. The forward ends of the plates $v^{50}$ are offset slightly, as shown in Fig. 6, and project beyond the plates $v$ and $v^5$, and said plates $v$ and $v^5$ are recessed at $v^{51}$ to receive the offset ends of the plates $v^{50}$ when the latter are pressed inward. The plates $v^{50}$ normally project a short distance and are pressed forward by springs $v^{52}$; but when the jaws $v$ $v^5$ are brought toward each other to jam or pinch the wrapper and form a corrugated, indented, or scored neck said plates $v^{50}$ will recede, only to be thrust forward again and free the wrapper as the plates $v$ $v^5$ separate. The spring on the jaw $v$ is made heavier than the spring on the jaw $v^5$, so that the tendency will be for the plate $v^{50}$ on the plate $v$ to exert a greater thrust on the wrapper than the opposite plate, to thereby throw the wrapped article always in a certain direction. By means of these disengaging devices the wrapper will be prevented from catching between the jamming or pinching plates.

The inner sides of the bars $v^4$ are provided with rack-teeth, and the bar $v^8$, which is located between them, is provided upon its opposite sides with similar rack-teeth, and two pinions $v^9$ $v^{10}$ are provided, the pinion $v^9$ meshing with the rack-teeth on the bars $v^4$ $v^8$ and the pinion $v^{10}$ meshing with the rack-teeth on the bars $v^4$ and the rack-teeth on the opposite side of the bar $v^8$, and said pinions are revolved in opposite ways, so that the bars $v^4$ $v^4$ will be moved together in one direction and the bar $v^8$ will be moved in the opposite direction. The rack-bar $v^{12}$ is held in engagement with the pinion $v^{10}$ and is moved longitudinally to revolve said pinion, which latter moves the rack-bars and the other pinion. The rack-bar $v^{12}$ is yieldingly connected to a rod $v^{13}$, which is yieldingly connected to a slotted plate $v^{14}$, supported by a rod passing through its slot, and said plate has a laterally-projecting pin $v^{15}$, (see dotted lines, Fig. 5,) which enters a cam groove $v^{16}$, formed in a disk $v^{17}$, which is secured to the main shaft $f^5$. As the shaft revolves the rack-bar will be reciprocated longitudinally, yielding as may be required to ease the pressure on the wrapper.

As the wrappers vary in size by means provided for varying their length, it is desirable to move the plates $v$ $v^5$ variable distances from each other, so that the opening or passage between said plates will be but little larger than the article, to thereby more efficiently gather in the edges of the wrapper. To accomplish this result, a limiting-stop $v^{55}$ is provided, against which the rack-bar $v^{12}$ strikes when the plates $v$ $v^5$ recede from each other, and said stop is adjustable to thereby vary the length of stroke of the rack-bar.

The article is forced down through the centering device onto the wrapper, which is held by the wrapper-support just beneath it, and onto a rest $t^{50}$ by means of a plunger $c'$, and the article reposing on the rest and held by the plunger is carried down through the jamming devices, which operate to gather in and jam or pinch the wrapper, and then the wrapped article is ejected. To accomplish these results, the plunger is movable vertically and also swings on its vertical axis, and the rest is also movable vertically. The plunger-rod $c'$ is secured to one end of a pivoted lever $c^3$, the opposite end of which is connected by a rod $c^5$ with a crank on the shaft $f^5$ and is thereby moved vertically, and a collar $c^{50}$ is secured to said plunger-rod at a point between the bearings in which it slides, which has a projecting pin $c^{51}$, which enters and slides in a vertical groove formed in a vertically-disposed bracket $c^{52}$, which is loosely mounted upon the rod $c'$, and an arm $c^{53}$ projects rigidly from said bracket, to the extremity of which one end of a link $c^{54}$ is connected, the opposite end of which is connected to the lower end of a pivoted lever $c^{55}$, the upper end of said lever engaging a cam on the shaft $f^5$. As the plunger-rod slides vertically the pin $c^{51}$ slides freely in the groove formed in the bracket, and as the bracket is swung on its vertical axis by the means connected to the arm $c^{53}$ the plunger-rod will be turned on its vertical axis. The rest $t^{60}$ is supported at the upper end of an upright rod $t$, which is suitably guided and which has at its lower end a laterally-projecting pin, to which the lower end of a spring $t^3$ is connected, the upper end of said spring being attached to an adjustable strip or chain which is attached to a fixed point on the frame, said spring acting to raise the rest to a position just beneath the severed wrapper, which is supported by the wrapper-holder 80. The rest $t^{60}$ is forced down by the plunger when forcing the article down through the centering device and through the jamming or pinching devices, and to hold the rest in its lowermost position a locking device is provided for it which is moved into engagement with it at such time, and said locking device is disengaged when the plunger again rises and arrives at its most elevated position or thereabout. The rod $t$, bearing the rest, is provided with ratchet-teeth $t^7$, and a pawl $t^6$ engages said ratchet-teeth, which is secured to a pivoted rod $t^9$, having its bearings in the frame, and to said rods an arm $t^{10}$ is secured, having a laterally-projecting pin $t^{12}$, which obstructs the path of movement of a cam-shaped projection $t^{13}$, formed on the collar $t^{14}$, which is rigidly secured to the plunger-rod. A latch $t^{15}$ is loosely connected to the extremity of said arm $t^{10}$, which passes up through a hole in a plate $t^{16}$, secured to the frame, which is adapted to engage said plate and hold the pawl out of engagement with the ratchet-teeth and to be disengaged from said plate and moved upward by a spring $t^{17}$ to throw the pawl into engagement with said ratchet-teeth. The end of the latch-arm $t^{15}$ is beveled, as shown in Fig. 17, and the plunger-rod has a collar secured to it bearing a pin $t^{19}$, which when the plunger-rod descends engages said beveled end of the latch-arm and disengages the latch from the plate. Thus when the plunger-rod rises and reaches its most elevated position or thereabout the cam $t^{13}$ will strike the pin $t^{12}$ and thrusting it aside will disengage the pawl $t^6$ and pull the latch-arm down into engagement with the plate, permitting the rest to rise by the action of the spring $t^3$. The rest is thereafter forced down by the plunger-rod, and when said plunger-rod arrives at its lowermost position the pin $t^{19}$ on said rod disengages the latch-arm from the plate and permits the pawl to again engage the ratchet-teeth.

As an ejector for the wrapped articles an arm $t^{22}$ (see Figs. 19 and 20) is pivoted to an ear on the frame having a circularly-formed eye at its extremity, and said arm swings in a horizontal plane and strikes the wrapped article on the rest and knocks it off. To the pivotal end of said arm $t^{22}$ a short arm $t^{23}$ is formed, to which is connected a horizontally-movable bar $t^{25}$, bearing at its extremity a roll which is held pressed into engagement with the cam $t^{26}$ on the shaft $f^5$ by means of a spring $t^{27}$, one end of which is connected to said bar and the other end of which is connected to the frame. The ejector is thus positively moved by the power-actuating mechanism and may be caused to operate at any time desired, so as to knock off the wrapped article at the proper time regardless of the position of the other parts.

Having thus described my invention, what I claim as new, and desire to secure by Letters Patent, is—

1. In a wrapping-machine, a hopper having a narrow exit, two agitators therein located at opposite sides of said exit, pivoted operating-levers connected to said agitators, a pivoted lever connected to one of said operating-levers, a rotating cam for operating it, and a sliding bar connected to the other operating-lever, and a rotating cam for operating it, substantially as described.

2. In a wrapping-machine, a trough for the articles having a shoulder at the end, a lifting-lever, and a lifter, for bodily lifting the article next said shoulder, pivotally connected to said lever, and means for operating said lifting-lever, substantially as described.

3. In a wrapping-machine, a trough for the article having a shoulder at the end and having an opening in its bottom next said shoulder, a pivoted lifting-lever, and a lifter contained in said opening, pivotally connected to said lever and means for guiding said lifter in a straight line as the lifting-lever moves on its pivot, substantially as described.

4. In a wrapping-machine, a trough for the article having a shoulder at the end, a lifting-lever, a support pivotally connected thereto, and a lifting-plate for lifting the article next said shoulder, pivotally connected to said support, and means for operating said lever, substantially as described.

5. In a wrapping-machine, a trough for the article having a shoulder at the end, and having an opening in its bottom next said shoulder, a pivoted lifting-lever, a support pivotally connected to said lever, a lifting-plate contained in said opening for lifting the article next said shoulder, pivotally connected to said support and having arms extending downwardly from its under side, and means for operating said lifting-lever, substantially as described.

6. In a wrapping-machine, the combination of wrapping devices, means for operating them, means for delivering the articles to said wrapping devices, means for feeding severed wrappers to said wrapping devices, a stop-motion for the machine having a controlling member normally located in the path of progress of the articles, a starting-lever for moving said member to abnormal position when starting the machine to place it under the control of the articles, the presence or absence of which thereafter determines the position of said member, substantially as described.

7. In a wrapping-machine, the combination of wrapping devices, means for operating them, means for delivering the articles to said wrapping devices, means for feeding severed wrappers to said wrapping devices, a stop-motion for the machine having a controlling member normally located in the path of progress of the articles, a starting-lever for moving said member to abnormal position when starting the machine, means for holding said member in abnormal position and for releasing it at predetermined intervals, to place it under the control of the articles, the presence or absence of which at such time determining the position of said member, substantially as described.

8. In a wrapping-machine, the combination of wrapping devices, means for operating them, means for delivering the articles to said wrapping devices, means for feeding severed wrappers to said wrapping devices, a stop-motion for the machine having its controlling member normally located in the path of progress of the articles, means for moving said member out of such path when starting the machine, a rotating cam for holding said member out of such path and for placing it under the control of the articles, at predetermined times, permitting its return in case the article is absent, substantially as described.

9. In a wrapping-machine, the combination of wrapping devices, means for operating them, means for delivering the articles to said wrapping devices, means for feeding severed wrappers to said wrapping devices, a clutch mechanism secured to the main shaft for engaging the driving-wheel, a pivoted arm controlling the operation of said clutch mechanism which is normally located in the path of progress of the articles, a starting-lever for moving said arm out of such path and for releasing the clutch mechanism, means for thereafter holding said arm out of such path and for placing it under the control of the articles, at predetermined times, permitting its return in case the article is absent, substantially as described.

10. In a wrapping-machine, the combination of wrapping devices, means for operating them, means for delivering the articles to said wrapping devices, means for feeding severed wrappers to said wrapping devices, a stop-motion for the machine comprising a clutch mechanism and having a controlling member normally located in the path of progress of the articles, a starting-lever for releasing said clutch mechanism and for moving said member to abnormal position when starting the machine to place it under the control of the articles and a controlling device permitting the controlling member to act only at predetermined times, substantially as described.

11. In a wrapping-machine, the combination of wrapping devices, means for operating them, means for delivering the articles to said wrapping devices, means for feeding severed wrappers to said wrapping devices, a clutch mechanism secured to the main shaft for engaging the driving-wheel, having an outwardly-projecting arm, means for restraining said arm, a wedge-block controlling said means, a pivoted arm, for moving said wedge-block, which is normally located in the path of progress of the articles, means for moving said wedge-block to raise the arm out of such path and also release the clutch mechanism, means for holding said arm in its elevated position, and for placing it under the control of the articles at predetermined times, permitting its return in case the article is absent, substantially as described.

12. In a wrapping-machine, the combination of wrapping devices, means for operating them, means for delivering the articles to said wrapping devices, means for feeding severed wrappers to said wrapping devices, a clutch mechanism secured to the main shaft for engaging the driving-wheel, a pivoted arm controlling the operation of said clutch mechanism which is normally located in the path of progress of the articles, means for moving said arm out of such path and for releasing the clutch mechanism, a rotating cam for holding said arm out of such path and for placing it under the control of the article at predetermined times, permitting its return in case the article is absent, substantially as described.

13. In a wrapping-machine, the combination of wrapping devices, means for operating them, means for delivering the articles to said wrapping devices, means for feeding severed wrappers to said wrapping devices, a clutch mechanism secured to the main shaft for engaging the driving-wheel, a pivoted arm controlling the operation of said clutch mechanism, which is normally located in the path of progress of the articles, a cam having a handpiece attached to it for moving said arm out of such path and for releasing the clutch mechanism, and means for holding said arm out of such path, and for placing it under the control of the article at predetermined times, permitting its return in case the article is absent, substantially as described.

14. In a wrapping-machine, the combination of wrapping devices, means for operating them, means for delivering the articles to said wrapping devices, means for feeding severed wrappers to said wrapping devices, a clutch mechanism secured to the main shaft for engaging the driving-wheel, having an outwardly-projecting arm, means for restraining said arm, a wedge-block controlling said means, a pivoted arm, for moving said wedge-block, which is normally located in the path of progress of the articles, a cam having a handpiece attached to it located beside the wedge-block-carrying bar which is adapted to engage said bar, or block thereon, and move said arm out of such path, and also release the clutch mechanism, and means for holding said arm out of such path and for placing it under the control of the article at predetermined times, permitting its return in case the article is absent, substantially as described.

15. In a wrapping-machine, a set of jamming or pinching jaws, means for moving them toward and from each other, and means for disengaging the jammed or pinched wrapper from said jaws as they recede, substantially as described.

16. In a wrapping-machine, a rest for holding the orange with its wrapper partially enveloping it, a set of jaws for gathering in the edges of the wrapper and for jamming or pinching said edges together, means for moving said jaws toward and from each other, and means for disengaging the jammed or pinched wrapper from the jaws as they recede and while the orange is supported by said rest, substantially as described.

17. In a wrapping-machine, a rest for holding the orange with its wrapper partially enveloping it, a set of jaws for gathering in the edges of the wrapper and for jamming or pinching said edges together, means for moving said jaws toward and from each other, means for disengaging the jammed or pinched wrapper from the jaws as they recede and while the orange is supported by said rest, and means for removing the wrapped orange from the rest after the wrapper has been disengaged from the jaws, substantially as described.

18. In a wrapping-machine, a set of jamming or pinching jaws for the wrapper, means for moving them toward and from each other, and disengaging devices for the wrappers located in proximity to said jaws, substantially as described.

19. In a wrapping-machine, a set of jamming or pinching jaws for the wrapper, means for moving them toward and from each other, a yielding plate normally projecting from the inner edge of each jaw, which acts to disengage the wrapper therefrom, substantially as described.

20. In a wrapping-machine, the combination with paper feeding and severing devices, and means for adjusting said feeding devices, of a set of jamming or pinching jaws, means for moving them toward and from each other, and a limiting-stop for regulating the distance apart said jaws shall move, substantially as described.

21. In a wrapping-machine, the combination with wrapping devices, and means for operating them, a wrapper-support and means for feeding a wrapper thereto, a rest located beneath said wrapper-support, a plunger-rod, means for moving said rod vertically, a pin projecting from said rod, a swinging bracket having a vertical groove for said pin, and means for swinging said bracket on its vertical axis to thereby correspondingly turn the plunger-rod, substantially as described.

22. In a wrapping-machine, a plunger, means for operating it, a rest for the article supported by a rod having ratchet-teeth, a spring for lifting said rest, a locking device for said rest consisting of a spring-held pawl which engages the ratchet-teeth, a cam on the plunger-rod for disengaging said pawl to release the rest, a latch for holding said pawl disengaged, and a pin on the plunger-rod for releasing said latch, substantially as described.

23. In a wrapping-machine, a rest upon which the wrapped article is deposited, means for moving it vertically, a horizontally-swinging ejector-arm, an operating-bar connected to it and a rotating cam into engagement with which said bar is held pressed by a spring, substantially as described.

24. In a wrapping-machine, a rest upon which the wrapped article is deposited, means for moving it vertically, a horizontally-swinging ejector-arm, an operating-bar connected to it, a cam for operating said bar and a power-driven shaft bearing said cam, substantially as described.

In testimony whereof I have signed my name to this specification in the presence of two subscribing witnesses.

MILTON H. BALLARD.

Witnesses:
B. J. NOYES,
H. B. DAVIS.